3,188,195
PELLET OF IRON ORE AND FLUX, AND METHOD FOR MAKING SAME
Eugene W. Price, West Allis, Wis., assignor to Allis-Chalmers Manufacturing Company, Milwaukee, Wis.
Original application Oct. 5, 1961, Ser. No. 143,096. Divided and this application Nov. 26, 1963, Ser. No. 326,283
4 Claims. (Cl. 75—5)

This invention relates to a method for making a hard composite pellet having a core of flux material surrounded by a coating of flux-free iron ore. This application is a division of application Serial Number 143,096, filed October 5, 1961.

The most common way of producing metallic iron from iron ore involves charging iron ore into a blast furnace along with a fluxing material. The iron ore, which is an oxide of the elemental metal, is reduced to metallic iron by blowing high temperature reducing gases through the blast furnace. The fluxing material is used to promote fusion of impurities in the ore (such as alumina, silica, etc.) and to cause the fusion to take place at a lower temperature than is required to melt such materials by themselves. The fluxing material is usually limestone and/or dolomite. In recent years as reserves of high grade iron ore have become depleted increasing use has been made of relatively low grade ores. Such low grade ores are utilized by first grinding the ore, then concentrating the ore followed by forming the concentrated ore into pellets. In this invention and the prior art, about ½ of one percent of bentonite is added to ground material to provide better water bound pellets. The pellets are dried and burned to give them sufficient strength to withstand handling, shipping and charging into a blast furnace. A considerable load is applied when such pellets are placed in a blast furnace and come under the loading pressure of a tall column of the material. The pellets must have considerable strength when in the blast furnace to avoid the lower layers of pellets being crushed by the weight of pellets above them, which if permitted to occur would tend to make the charge impervious to the passage of reducing gases that must be blow through the charge to reduce it. Ores occurring in nature that are relatively free of fluxing material have been successfully agglomerated and burned to provide pellets of considerable strength that are satisfactory for charging a blast furnace. One such process that has been especially successful in producing pellets of outstanding strength and great density while also being sufficiently porous for efficient reduction in the blast furnace, is disclosed in U.S. Patent 2,925,336, William F. Stowasser, Jr., Feb. 16, 1960. However, it is considered desirable to have some or even all of the fluxing material needed during reduction of iron ore, in the pellet when it is charged to the blast furnace. Having all of the fluxing material needed during reduction of iron ore in the pellet itself has the obvious and economically significant advantage of requiring fewer components to be fed to a blast furnace. Furthermore, having a fluxing material right in the pellet provides a uniform distribution of flux and iron ore that can never be achieved by charging alternate layers of iron ore and fluxing material into a blast furnace.

According to the present invention, water bound composite pellets of approximately one-half inch diameter are made each having an approximately ¼ inch core surrounded by a coating approximately ⅛ inch thick. The ¼ inch core comprises approximately 13 percent by volume of the composite pellet. The inner core consists of fluxing material and the outer coating is composed of only flux-free iron ore. The material made into the core in this example is flux ground to a size of 95 percent minus 200 mesh and rolled into cores ¼ inch in diameter. The cores are then rolled in flux-free ore to apply the approximately ⅛ inch flux-free iron ore coating packed to the degree that the coating is permeable to water vapor and $CO_2$. The dimensions described provide a composite pellet in which there is by weight approximately 8 percent flux to 92 percent iron ore, which for the particular ore involved was the desired relationship for blast furnace feed in order to flux not only the siliceous component of the iron ore but also the siliceous component (the ash) in the coke required for reduction. The described pellets are then dried at a rate that is fast enough to vaporize the moisture within the inner core and permit the vapor to escape through the outer coating but the rate is also slow enough to heat escaping vapor only to a pressure below that which will fracture the coating. Then, after the vapors have escaped, the pellets are further heated to a temperature above the drying temperature but below the incipient melting temperature of the ore, to effect hardening of the pellets outer coating. It has been found desirable to maintain the maximum temperature of the pellets during this final hardening to approximately 2200–2400 degrees Fahrenheit since the incipient melting temperature of most iron ore is about 2500 degrees Fahrenheit. In this pellet there is no problem of slag (calcium and/or magnesium ferrites) penetrating the outer shell of iron ore at high temperature, i.e., 2400 degrees Fahrenheit. This is so because the central core of fluxstone begins to decompose at about 1600 to 1800 degrees Fahrenheit with attendant loss of carbon dioxide ($CO_2$). This loss of gas causes the inner core to shrink in volume thus breaking contact with the iron ore and thus interrupting the formation of slag. The interruption of slag formation despite the high temperature, of course, represents one of the primary objects of the invention.

Other important objects of the present invention include providing new and improved green water bound pellets, heat hardened pellets, pellets having iron in easily reducible forms, and methods all leading toward improving overall techniques for processing and converting mineral ores into more useful forms.

Other and more specific objects and how they are achieved will appear from the following description when read together with the accompanying drawings, in which.

Figure 1:
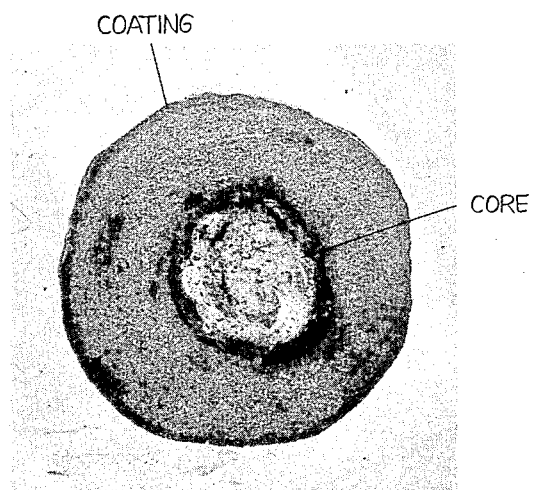
FIG. 1 is a photograph showing the interior of a heat hardened pellet according to present inventions, the pellet being ready for use as blast furnace feed, and the photograph having been taken of an image magnified six times.
Figure 3:
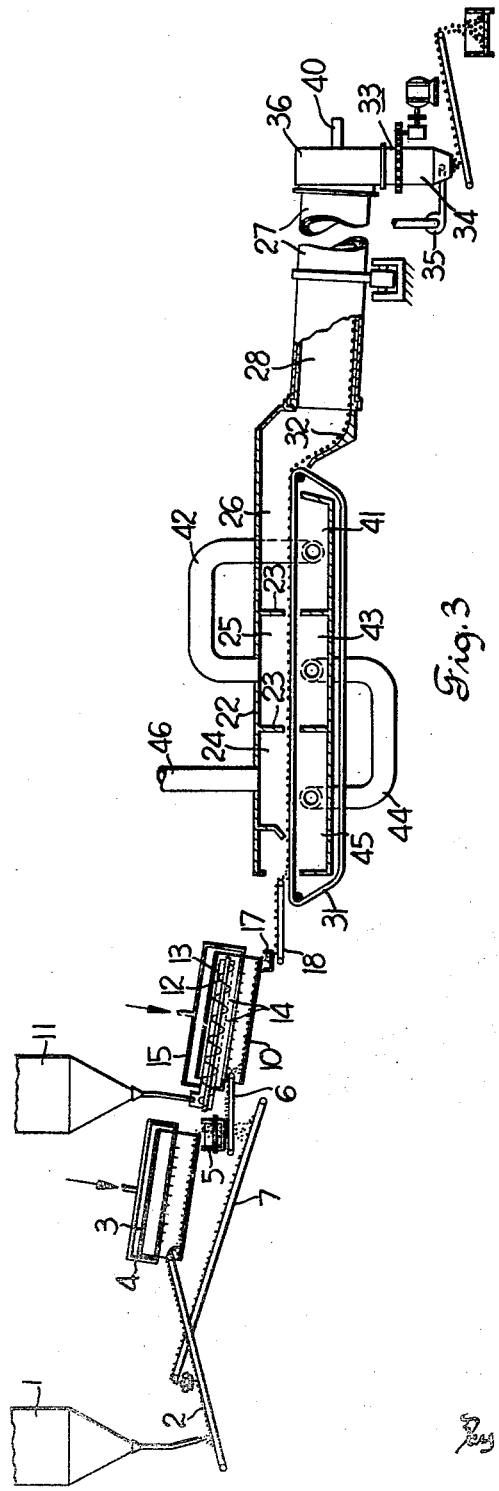
FIG. 3 is an embodiment of apparatus for carrying out the present invention.

With reference to FIGS. 1 and 3, a process will be described that can be performed on the apparatus of FIG. 3 to produce a pellet as shown in FIG. 1. FIG. 1 is labeled to point out the core and outer coating. This figure will be discussed at greater length after first describing a process and apparatus shown in FIG. 3. The apparatus of FIG. 3 (along with other apparatus) is described and claimed in a copending application Serial No. 143,097, filed October 5, 1961.

FIG. 3 shows a hopper 1 which is a storage container for crushed fluxstone. The flux in hopper 1 may be funneled out at a controlled rate to a conveyer 2 that delivers this material to a balling drum 3. Balling drum 3 is mounted on an incline for rotation (by means not shown) about its central axis. A water delivery pipe 4 is provided to spray water upon finely divided flux in the drum 3. Small droplets of water falling into the finely divided particles of solid material form small cores that roll down the incline of the drum 3 as the drum rotates. These small cores grow larger as they roll through the drum. The rate of feed, the slope of the balling drum, the rate of rotation of the drum and the quantity of water delivered in the form of a spray within the drum are the design parameters that must be coordinated to provide the desired core formation within the drum 3. The cores discharged from drum 3 are screened to provide the desired size, as for example, a diameter of ¼ inch. This sizing may be accomplished by depositing the cores discharged from drum 3 on a screening device 5 that delivers properly sized cores to a conveyor 6 and discharges undersize cores to a conveyor 7. Undersize pellets deposited on the conveyor 7 may be recycled through the system so that this material is ultimately used in the system.

A coating of flux-free ore is packed about the cores to provide a composite pellet by delivering the properly sized cores on conveyor 6 to a reroll drum 10. A hopper 11 provides a supply of flux-free iron ore which is funneled in controlled amounts to the reroll drum 10. The flux-free ore is distributed evenly throughout the entire length of the reroll drum 10 by a screw conveyer 12 mounted within a tube 13. The tube 13 is provided with openings 14 along its entire length to deposit material in the reroll drum along its entire length. Within this reroll drum 10 the flux-free ore is packed in the form of an outer coating around the cores previously formed in the balling drum 3. As mentioned earlier, the flux-free ore is packed about the cores to the degree that the outer coating is permeable to water vapor that must be driven off (as will be explained later) and also permeable to carbon dioxide gas that will be generated during subsequent steps in the treatment that will be described. A water delivery pipe 15 is provided within the reroll drum which may add moisture to the flux-free ore delivered from the hopper 11. The moisture, if introduced into the reroll drum, must also be introduced along the entire length of the reroll drum and must be sprayed into the drum in an even finer spray than the water that is introduced to the balling drum 3. The reason that the moisture introduced into the reroll drum must be in the form of a very fine spray is that although it may be desired to increase the moisture content of the material in the reroll drum 10, it is not desired that additional cores be formed within that drum. It is only desired that outer coatings be applied to the cores previously formed in drum 3. The design parameters for achieving a coating of, for example, a thickness of approximately ⅛ inch and with the desired permeability may include the rate of feed to the reroll drum, the slope of the drum, the speed of rotation, and the moisture content of the coating material in the reroll drum. These parameters can be coordinated to provide a coating on the cores with the permeability described.

The composite pellets formed by applying an outer coating in reroll drum 10 to the cores that were formed in balling drum 3, may be discharged from the reroll drum 10 to a screening device 17 that sizes the composite pellets to the desired size as per the example previously referred to, ½ inch in diameter. The proper composite pellets are discharged from the screening device 17 to a conveyer 18 that carries the pellets to a treating furnace 20.

The treating furnace 20 includes structures that define four separate treating zones. Hood structure 22 and internal baffling 23 define three zones 24, 25 and 26 while a rotary kiln 27 defines the fourth zone numbered 28. Zone 24 is a preliminary drying zone, zone 25 a final drying zone, zone 26 a preburning zone, and the fourth and final zone 28 is a final burning zone. The structure shown that will be described as defining such zones is particularly capable to handle green pellets (bound by water and a small amount of bentonite) fed to this furnace in a very wet condition. In many, if not most installations, the predrying zone 24 may not be required. To describe apparatus capable of operation under the most adverse conditions, the furnace 20 will be described as including the predrying zone 24.

Composite pellets from the conveyer 18 are carried through the three zones within the hood 22 by a gas permeable conveyer 31. Pellets are deposited on the conveyer 31 to move as a body through zones 24, 25 and 26 with individual pellets being, relatively speaking, at rest within this moving body. From the conveyer 31, the pellets are discharged down an incline 32 and are fed into the rotary kiln 27. Pellets are discharged from the kiln 27 into a cooling device such as shown at 33. There are many types of cooling devices that can be used depending on the size of the installation. The cooling device 33 is of relatively simple construction and may be adequate for relatively small operations. Other well-known types of coolers will be used for large installations. The cooler shown comprises a rotating, vertical shaft 34 that contains a downwardly moving column of pellets discharged from kiln 27. A blower 35 blows cooling air upwardly through the descending column of pellets to cool the pellets and preheat the ascending air which is admitted to the firing hood 36 of the kiln 27. Pellets discharged from the lower end of the cooler 33 may be transported away from the installation as desired.

A burner 40, projecting through burner hood 36, provides for a flame within the kiln 27. Hot gases proceed through the kiln 27 and the zone 28 defined therein and pass into zone 26 within the hood structure 22. From the zone 26 the hot gases are drawn downwardly through the pellets and the conveyer 31 into a suction box 41 below the grate. From the suction box 41 the hot gases pass through a conduit 42 to zone 25. Here the hot gases make a second pass downwardly through the pellets on the conveyer 31 and are collected in a second suction box 43. The hot gases pass from the second suction box 43 through a conduit 44 that leads these gases to a windbox 45 beneath zone 24. Here the hot gases pass upwardly through the pellets on the traveling grate 31 into zone 24 and they are exhausted through a conduit 46. The flow of gases may be promoted by such as an exhaust fan (not shown) arranged to draw gases out through conduit 46.

In this embodiment shown in FIG. 3 as previously mentioned, it is assumed that the pellets are quite wet and require two-stage drying. Thus, it an apparatus providing such two-stage drying, the wet pellets deposited upon the traveling grate 31 will move into and through zone 24. As the pellets pass through this preliminary drying zone warm gases will pass upwardly through the pellets on the grate and out conduit 46. When a preliminary drying zone is provided, as here shown, because of exceptionally wet pellets, it is preferred that the gases passing through the pellets in the first zone be directed in an upwardly direction rather than in a downflow direction as will be subsequently described for final drying and preburning. The reason for providing upflow preliminary drying in the first zone is that it is necessary to carry the maximum amount of water away from the pellets in the lower levels of the pellets on the grate and to do so as quickly as possible. If a downflow of gases were used in a first zone for preliminary drying of very wet pellets an even greater concentration of water would result at the bottom of the body of pellets and in this very wet environment the green, relatively weak pellets could be easily squashed. This would not only destroy the shape and composition that so much trouble has been gone to to provide, but also the permeability of the body of pellets on the grate would be destroyed and further gas flow could not find its way through the mass of pellets on the grate. For such reasons, therefore, an upward flow of gases through a first drying zone, when very wet pellets are handled, is preferred.

In a final drying zone 25 (which in many installations may be the first zone over conveyer 31) pellets are carried through the zone and drying gases are directed downwardly through the pellets on the traveling grate. Substantial drying (at temperatures of 500–900 degrees Fahrenheit) of the pellets should be achieved before they are permitted to leave this zone. Thus by proper control of the speed of the conveyer 31, the pellets must be dried thoroughly but at a slow enough rate that will insure water vapor having an opportunity to get out of the pellet without fracturing the outer coating. Dry pellets are ready to be carried through the preburning zone 26.

Figure 2:
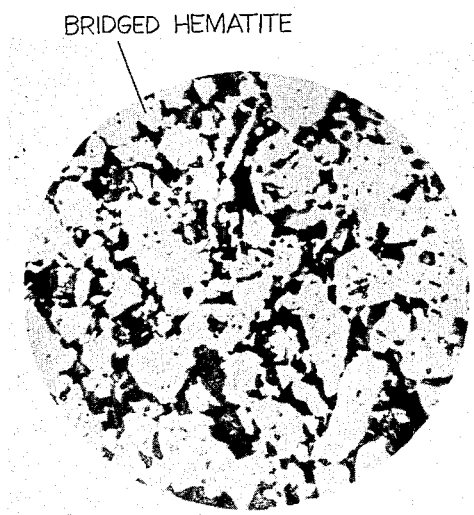
FIG. 2 is a photograph showing the coating of a heat hardened pellet according to a preferred embodiment of the present invention, and bridged hematite grains that impart strength and abrasion resistance.

Within the preburning zone the temperature of the pellets will be raised sufficiently so that any magnetite that is present in the iron ore will thermally convert to hematite. Such a conversion takes place at about or approximately between 1600 and 1800 degrees Fahrenheit. This transformation can be symbolically expressed by the formula $4Fe_3O_4 + O_2 \rightarrow 6Fe_2O_3$. Pellets entering the preburning zone 26, although dry, will have little physical strength. Sufficient physical strength must be imparted to these pellets within the preburning zone so that they can be discharged to the final burning zone where they are tumbled. By the time the pellets in zone 26 reach 1600 degrees Fahrenheit any magnetite that is present will be at least superficially oxidized to hematite. The heating of particles of hematite in this temperature range causes individual grains of hematite in the outer coating to begin to bridge together by grain growth and intergranular bridging in the solid state without any reaction with any of the available silica or flux (flux is available only in the core). After individual grains have so begun to bridge together in the outer coating but before a complete network of such bridged grains is completed the body of pellets in zone 26 is disrupted and discharged into the zone 28 within the kiln 27 wherein they are tumbled during their final heat treating. FIG. 2 shows what the bridged hematite grains look like so that the aforementioned conditions can be recognized. While the apparatus and process should be so controlled to insure the beginning of such bridging, it is also important that the body of pellets be disrupted before the complete network of bridged grains is achieved. A densified outer coating around the core that is highly resistant to degradation only if the final building of this network is caused to occur while the pellets are rolling and tumbling within the kiln 27. The temperatures required to convert magnetite to hematite and initiate the bridging of grains to give the pellets sufficient strength to withstand rolling and tumbling is not quite high enough to cause the liquid phase of the slagging constituents to occur. If the rolling and tumbling of the pellets is begun before the temperature that causes the liquid phase of the slagging constituents is reached, then when the liquid finally does form it will be acted upon equally in all directions by the force of gravity. Very little slag will form and it will not be a problem. This is so because the central core of fluxstone begins to decompose at about 1600 to 1800 degrees Fahrenheit with attendant loss of carbon dioxide ($CO_2$). This loss of gas causes the inner core to shrink in volume thus breaking contact with the iron ore and thus interrupting the formation of slag.

At the same time that the force of gravity is thus being neutralized by the rolling action of the pellet, the rolling and tumbling action of the pellet further results in the densification of the outer coating of the pellet because the pellet is exposed to a pounding action while the network of bridged grains is still forming. Once the network has been completed it is then too late to achieve this densification. The importance of the proper timing of the transfer of pellets from the grate to the kiln, to obtain the very best pellets, can be appreciated.

Thus it can be seen that the inventor has made significant and important advances in this art. Since the concepts and techniques that the inventor herein teaches relate to novel articles of manufacture both in the form of green water and bentonite bound pellets and heat treated and hardened pellets and process concepts, many variations may occur to those skilled in the art that will be within the spirit of the invention contributed by this invention. It is not therefore intended that the invention described should be limited to the particular examples discussed but rather that the invention should be considered as defined only in the appended claims.

The embodiments of the invention in which an exclusive property or privilege is claimed are defined as follows:

1. For making a strong pellet from iron ore and flux material, the process comprising: agglomerating a mixture of moisture and finely divided carbonate flux material free of added iron ore to provide a moist core; forming a composite pellet by loosely packing around said moist core an outer coating of moist iron ore free of added flux material and compressing said coating being packed about said core to the degree that said coating is permeable to vapor of said moisture and a dioxide gas of the carbon in said carbonate; shrinking said core away from said outer coating by heating said pellet to a carbonate calcining temperature which will produce and drive off from said core a vapor of said moisture and a dioxide gas of the carbon in said carbonate, with said heating for shrinking said core being applied at a rate less than a rate observed to heat escaping vapor and gases to a pressure that will fracture said coating; and then after said vapor and gases have been driven off, then further heating said pellet above the drying temperature to effect hardening of said pellet.

2. For making a strong pellet from iron ore and flux material, the process comprising: agglomerating a mixture of moisture, a binder and finely divided carbonate flux material free of added iron ore to provide a moist core; forming a composite pellet by loosely packing around said moist core an outer coating of moist iron ore free of added flux material and compressing said coating being packed about said core to the degree that said coating is permeable to vapor of said moisture and a dioxide gas of the carbon in said carbonate; shrinking said core away from said outer coating by heating said pellet to a carbonate calcining temperature which will produce and drive off from said core a vapor of said moisture and a dioxide gas of the carbon in said carbonate, with said heating for shrinking said core being applied at a rate less than a rate observed to heat escaping vapor and gases to a pressure that will fracture said coating; and then after said vapor and gases have been driven off, further heating said pellet above the drying temperature to effect in said coating a network of bridged hematite grains.

3. For making strong pellets from iron ore and flux material, the process comprising: agglomerating a mixture of moisture, a binder and finely divided carbonate flux material free of added iron ore to provide a moist core; forming a composite pellet by loosely packing around said moist core an outer coating of moist iron ore free of added flux material and compressing said coating being packed about said core to the degree that said coating is permeable to vapor of said moisture and a dioxide gas of the carbon in said carbonate; establishing at least first, second and third pellet heating zones; forming said composite pellets into a movable gas permeable body with said pellets at rest relative to each other within said body; conveying said body of pellets through said first zone to heat said pellets to vaporize said moisture and drive off said moisture at less than a rate that is observed to develop a pressure that will fracture said coating; shrinking said core away from said outer coating by conveying said body through said second zone to further heat said pellets to a carbonate calcining temperature which will form and drive off a dioxide gas of the carbon in the carbonate and to initiate bridging of adjacent grains of hematite; and then before a continuous network of bridged hematite grains is achieved throughout the coating of each pellet, disrupting said body of pellets and tumbling said pellets through said third zone while heating said tumbling pellets to a range above the temperatures of said first and second zones but below the incipient melting temperature of the ore in said coating, until bridging of said hematite grains yields a network in the coating of each pellet.

4. For making strong pellets from iron ore and flux material, the process comprising: agglomerating a mixture of moisture, a binder and finely divided carbonate flux material free of added iron ore to provide a moist core; forming a composite pellet by loosely packing around said moist core an outer coating of moist iron ore free of added flux material and compressing said coating being packed about said core to the degree that said coating is permeable to vapor of said moisture and a dioxide gas of the carbon in said carbonate; establishing at least drying, preburning and final burning zones; forming said composite pellets into a movable gas permeable body with said pellets at rest relative to each other within said body; conveying said body of pellets through said drying zone to heat said pellets to approximately 500–900 degrees Fahrenheit to vaporize and drive off said moisture at a rate less than a rate that is observed to heat escaping vapor to a pressure that will fracture said coating; shrinking said core away from said outer coating by conveying said body through said preburning zone to further heat said pellets to approximately 1600–1800 degrees Fahrenheit to form and drive off a dioxide gas of the carbon in the carbonate and to initiate bridging of adjacent grains of hematite; and then before a continuous network of bridged hematite grains is achieved through the coating of each pellet, disrupting said body of pellets and tumbling pellets in said final burning zone to a range (approximately 2200–2400 degrees Fahrenheit) above the temperatures of said drying and preburning zones but below the incipient melting temperature (approximately 2500 degrees Fahrenheit) of the ore in said coating, until bridging of said hematite grains yields a network in the coating of each pellet.

References Cited by the Examiner
UNITED STATES PATENTS 2,127,632 8/38 Najarian _____ 75—3
2,925,336 2/60 Stowasser _____ 75—3

BENJAMIN HENKIN, *Primary Examiner.*